United States Patent
Yu et al.

(10) Patent No.: US 10,028,319 B2
(45) Date of Patent: Jul. 17, 2018

(54) WI-FI CONNECTION METHOD AND WI-FI CONNECTION SYSTEM FOR MOBILE TERMINAL

(71) Applicant: SHANGHAI LIANSHANG NETWORK TECHNOLOGY CO., LTD., Shanghai (CN)

(72) Inventors: Luojia Yu, Shanghai (CN); Fayou Zhang, Shanghai (CN)

(73) Assignee: SHANGHAI LIANSHANG NETWORK TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 15/540,573

(22) PCT Filed: Dec. 25, 2015

(86) PCT No.: PCT/CN2015/098908
§ 371 (c)(1),
(2) Date: Jun. 29, 2017

(87) PCT Pub. No.: WO2016/107502
PCT Pub. Date: Jul. 7, 2016

(65) Prior Publication Data
US 2017/0347384 A1 Nov. 30, 2017

(30) Foreign Application Priority Data
Dec. 31, 2014 (CN) .......................... 2014 1 0851368

(51) Int. Cl.
*H04W 76/10* (2018.01)
*H04W 48/20* (2009.01)
(Continued)

(52) U.S. Cl.
CPC .......... *H04W 76/10* (2018.02); *H04W 12/06* (2013.01); *H04W 48/20* (2013.01); *H04W 76/02* (2013.01); *H04W 84/12* (2013.01)

(58) Field of Classification Search
None
See application file for complete search history.

(56) References Cited

U.S. PATENT DOCUMENTS

| 2012/0238287 A1 | 9/2012 | Scherzer |
| 2013/0184009 A1* | 7/2013 | Attar ............... H04W 48/08 455/456.2 |
| 2016/0105846 A1* | 4/2016 | Anderson ......... H04W 48/20 370/338 |

FOREIGN PATENT DOCUMENTS

| CN | 101836486 A | 9/2010 |
| CN | 102497638 A | 6/2012 |

(Continued)

*Primary Examiner* — Diane Lo
(74) *Attorney, Agent, or Firm* — Gokalp Bayramoglu

(57) ABSTRACT

The wi-fi connection method for a mobile terminal provided by the present invention achieves the wi-fi connection of the mobile terminal by obtaining the data list and the location information of the wi-fi hotspots from the mobile terminal, and sending the above information to the server. Subsequently analyzing above information by the server to find out the available wi-fi hotspot, then sending the password information back to the mobile terminal. Compared with the prior art, the present invention can greatly improve the efficiency and success rate of the wi-fi connection. The present invention also provides a wi-fi connection system which achieves the above method in a mobile terminal via a software, and the system facilitates the use for users.

9 Claims, 2 Drawing Sheets

(51) Int. Cl.
*H04W 12/06* (2009.01)
*H04W 84/12* (2009.01)
*H04W 76/02* (2009.01)

(56) References Cited

FOREIGN PATENT DOCUMENTS

| | | |
|---|---|---|
| CN | 103476139 A | 12/2013 |
| CN | 103813474 A | 5/2014 |
| CN | 104618991 A | 5/2015 |

\* cited by examiner

WI-FI CONNECTION METHOD AND WI-FI CONNECTION SYSTEM FOR MOBILE TERMINAL

CROSS REFERENCE TO RELATED APPLICATIONS

This application is the national phase entry of International Application No. PCT/CN2015/098908, filed on Dec. 25, 2015, which is based upon and claims priority to Chinese Patent Application No. 201410851368.9 filed on Dec. 31, 2014, the entire contents of which are incorporated herein by reference.

TECHNICAL FIELD

The present invention relates to the field of mobile communication, particularly to a method for wi-fi connection and a wi-fi connection system for a mobile terminal.

Wi-fi is a technology which can connect mobile terminals such as a personal computer, a hand-held device (e.g. pad, mobile phone), and the like with each other in a wireless manner. In fact, wi-fi is a high-frequency radio signal. [1] The wireless fidelity is a brand of wireless network communication technology and is owned by the Wi-Fi alliance. The purpose of wireless fidelity is to improve the interoperability between the wireless network products which are based on IEEE 802.11 standard. Some people call the local area network using protocols of IEEE 802.11 family as the wireless fidelity, and even equate the wireless fidelity with the wireless internet.

In the scope of wireless local area network, the wireless network refers to "wireless compatibility authentication", which is essentially a business authentication and is also a wireless networking technology at the same time. Previously, the computer was connected to the internet through a network line, while the wireless fidelity connects the internet through radio waves. Typically, the wireless fidelity is provided by a wireless router. Any internet connection can be achieved by the connection mode of wireless fidelity within the effective range covered by the electric waves of the wireless router. If the wireless router is connected to an ADSL line or other internet access lines, then it is called a hotspot.

Currently, most of the mobile devices have the wi-fi function. The nearby wi-fi can be connected to by turning on the wireless communication module. If there is no wi-fi hotspot nearby, the internet is accessed by the mobile data. Generally, the existing mobile devices can only search the nearby wi-fi hotspots, and cannot identify the connection possibility of each hotspot. Hence, if a user wants the mobile device to be connected to a wi-fi, each wi-fi should be tried one by one, the rate of success is very low, which greatly impact the user's experience.

SUMMARY OF THE INVENTION

To solve the issues existing in the prior art, the present invention provides a wi-fi connection method for a mobile terminal, including:
 S1: obtaining wi-fi hotspots near a mobile terminal;
 S2: obtaining a data list and location information of the wi-fi hotspots;
 S3: sending the data list and the location information to a server;
 S4: analyzing, via the server, the data list and the location information to obtain an available wi-fi hotspot, and sending password information of the available wi-fi hotspot to the mobile terminal; and
 S5: connecting, at the mobile terminal, the available wi-fi hotspot based on the password information.

Optionally, the specific method of S2 comprises, capturing, via the mobile terminal, a screenshot of an interface of the wi-fi hotspots near the mobile terminal to obtain a picture, analyzing the picture to obtain the data list of the wi-fi hotspots and analyzing the picture to obtain the location information of the wi-fi hotspots.

Optionally, the data list includes a wi-fi hotspot name, a signal intensity, and the number of the hotspots.

Optionally, the location information is longitude and latitude information.

Optionally, when the available wi-fi hotspot is obtained by the server, the password information of the wi-fi hotspot which is most likely to be successfully connected is obtained by an analysis, and the password information of the wi-fi hotspot which is most likely to be successfully connected is sent to the mobile terminal.

Optionally, the password information of the wi-fi hotspot which is most likely to be successfully connected is obtained by the analysis according to the location information.

Optionally, if the mobile terminal fails to connect to the available wi-fi hotspot, the server sends the password information of other wi-fi hotspot(s) to the mobile terminal.

Optionally, the data list and the location information are sent to the server through a mobile data network.

Optionally, a networking mode of the mobile terminal is checked before the step S3;
 if the mobile terminal has already been connected to a wi-fi network, then the operation ends;
 if the mobile terminal has already been connected to the mobile data network, S3 is subsequently performed;
 if the mobile terminal has already been connected to a wi-fi hotspot but fails to access the internet, then the wi-fi hotspot is disconnected and the mobile data network is connected.

The present invention also provides a wi-fi connection system for the mobile terminal including:
 a wireless transmission module for allowing a communication between the mobile terminal and a server; and
 a picture analyzing system for analyzing the picture of the interface of the wi-fi hotspots near the mobile terminal to obtain the data list and the location information of the wi-fi hotspots;
 wherein, the data list and the location information are sent by the mobile terminal to the server via the wireless transmission module, the data list and the location information are analyzed by the server to obtain the available wi-fi hotspot, and the password information of the available wi-fi hotspot is sent to the mobile terminal.

The wi-fi connection method for a mobile terminal of the present invention achieves the wi-fi connection of the mobile terminal by obtaining the data list and the location information of the wi-fi hotspots from the mobile terminal, sending the above information to the server, subsequently analyzing above information by the server to find out the available wi-fi hotspot, then sending the password information back to the mobile terminal. Compared with the prior art, the present invention can greatly improve the efficiency and success rate of the wi-fi connection.

DETAILED DESCRIPTION OF THE INVENTION

The present invention is further described in detail with reference to the drawings and specific embodiments. According to the following description and claims, the advantages and features of the present invention will be more apparent. It should be noted that the drawings are all well simplified and are not to scale, and are only provided to assist for a convenient and clear illustration of the objectives of the embodiments of the present invention.

Figure 1:
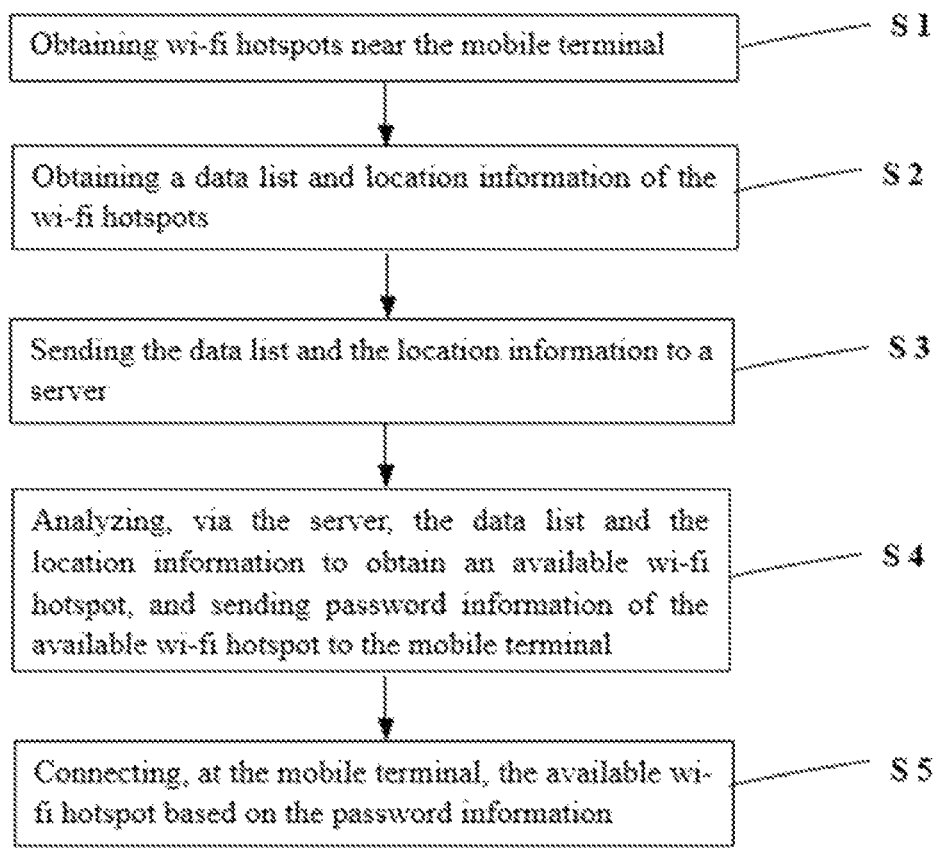
FIG. 1 is a general flow chart of the wi-fi connection method for a mobile terminal of one embodiment of the present invention.

The present invention provides a wi-fi connection method for a mobile terminal. Generally, the method is achieved with the assistance of an auxiliary software in the mobile terminal. As shown in FIG. 1, the wi-fi connection method for a mobile terminal includes:

S1: Obtaining wi-fi hotspots near a mobile terminal;

The mobile terminal may be a smart phone or a pad etc. with a wi-fi function. The option of selecting a wireless local area network to be connected generally provides a network list to the user for selection, i.e., the wi-fi hotspots near the mobile terminal.

S2: Obtaining a data list and location information of the wi-fi hotspots;

This step is performed on the mobile terminal. The specific method of obtaining the data list and the location information of the wi-fi hotspots comprises that, a software captures a screenshot of said network list (i.e. the interface of the wi-fi hotspots near the mobile terminal) to obtain a picture, and the picture is analyzed to obtain the data list and location information of the wi-fi hotspots. Specifically, the software should have an image recognition function which is capable of recognizing the information of characters, letters, etc. on the picture, and is capable of analyzing the wi-fi hotspots by means of recognized information to obtain the data list and location information of the wi-fi hotspots. The specific method of obtaining the data and information is not limiting to the present invention.

In the present embodiment, the data list includes a wi-fi hotspot name, a signal intensity and the number of the hotspots. The location information comprises the longitude and latitude information. According to said longitude and latitude information and data list information, the possibility to successfully connect each wi-fi is determined by the software with reference to the specific location of the mobile terminal.

S3: Sending the data list and the location information to a server;

After obtaining the data list and location information, it would be sent to the server by the mobile terminal. It follows that the step S3 may only be performed after the mobile terminal is connected to the internet. Therefore, before performing this step, the software will check the network connecting mode used by the mobile terminal. The specific process is as follows.

If the mobile terminal is already connected to a wi-fi network, then the operation ends, since it is unnecessary to keep trying to connect to other wi-fi hotspots;

if the mobile terminal is already connected to the mobile data network, then the step S3 may be subsequently performed, namely the data list and the location information are sent to the server via the mobile data network;

if the mobile terminal has already been connected to a wi-fi hotspot but fails to access the internet, then the wi-fi hotspot is disconnected and the mobile data network is connected. This scenario applies to the situation where there is an available wi-fi signal but the signal itself fails to access the internet. For example, the mobile terminal recognizes a wi-fi signal from a wireless router, takes the wireless router as a target hotspot and successfully connects to the wireless router, but the wireless router fails to connect the internet.

It should be ensured that the mobile terminal is connected to the internet, then the step S3 may be performed.

S4: Analyzing, via the server, the data list and the location information, obtaining an available wi-fi hotspot, and sending password information of the available wi-fi hotspot to the mobile terminal;

When the available wi-fi hotspot is identified by the server, the password information of the wi-fi hotspot which is most likely to be successfully connected is obtained by analysis, and then sent to the mobile terminal. In the preferred solution, the basis for analyzing the possibility of success by the server is the location information, i.e. the longitude and latitude information. The possibility of successful connection can be determined based on the longitude and latitude information of the wi-fi hotspot and the longitude and latitude information of the mobile terminal. The possibility of successful connection may also be analyzed with reference to the signal intensity of the wi-fi hotspot. The stronger the signal intensity, the higher the possibility of successful connection.

S5: Connecting, at the mobile terminal, the available wi-fi hotspot(s) based on the password information. After the mobile terminal obtains the password information of a wi-fi hotspot, a user may input said password information to try the connection. If the mobile terminal fails to connect to the available wi-fi hotspot, the server will send the password information of other wi-fi hotspot(s) to the mobile terminal.

The specific process comprises that, after the password information of the wi-fi hotspot which is most likely to be successfully connected is obtained by the server through analysis, this information will be firstly sent to the mobile terminal; after that, if the connection performed by the mobile terminal is failed, the server will conduct said analysis for the remaining wi-fi hotspots again, and send the password information of one of the remaining wi-fi hotspots which is most likely to be successfully connected to the mobile terminal, until the mobile terminal successfully connects to the wi-fi.

Figure 2:
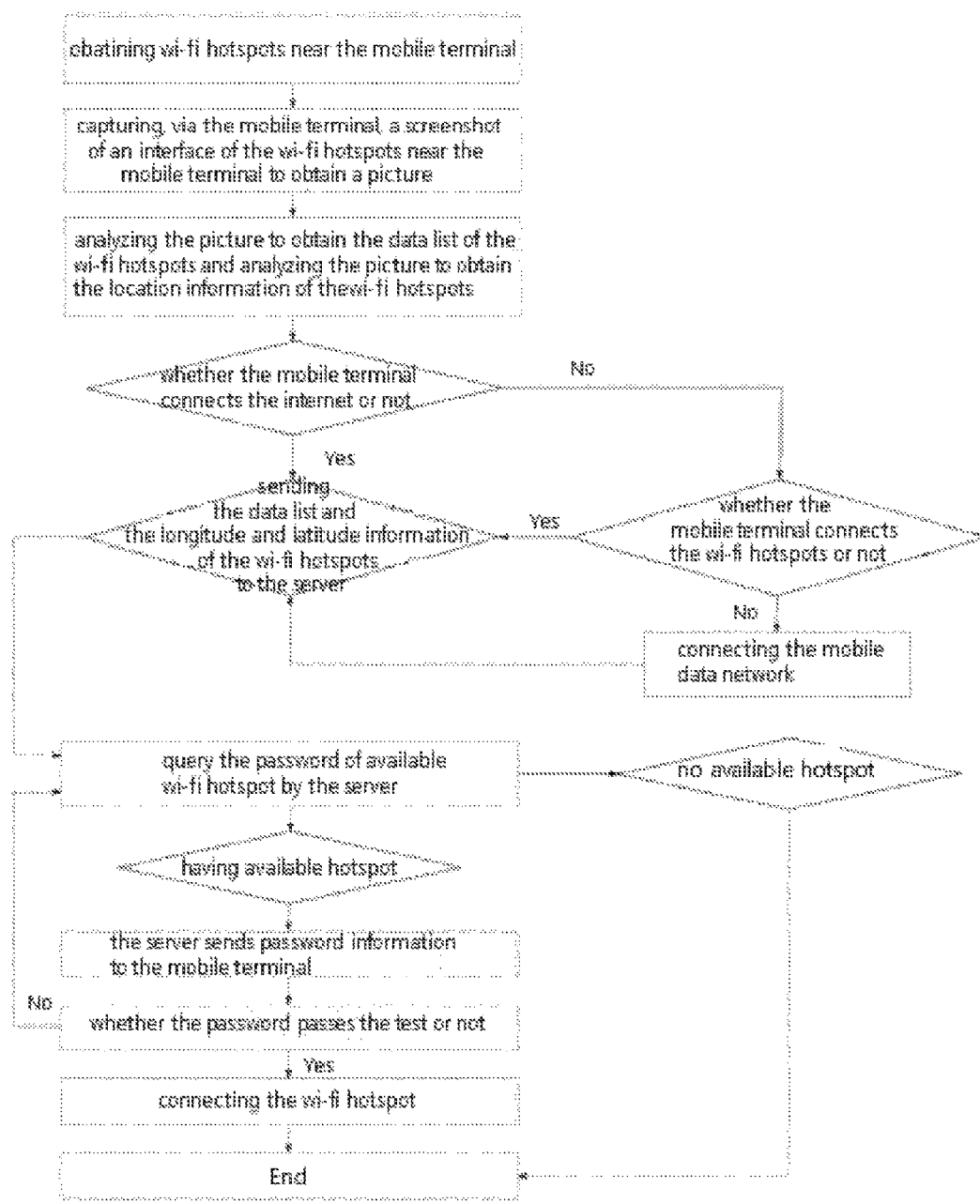
FIG. 2 is a specific flow chart of the wi-fi connection method for a mobile terminal of one embodiment of the present invention.

The above-mentioned wi-fi connection method for a mobile terminal includes a plurality of processes for connection attempts and judgement. To clearly understand the whole method, please refer to the FIG. 2. The FIG. 2 is a specific flow chart of the wi-fi connection method for the mobile terminal of one embodiment of the present invention.

Firstly, the wi-fi hotspots near the mobile terminal are obtained, then a screenshot of the interface of the wi-fi hotspots near the mobile terminal is captured via the mobile terminal to obtain the picture, the picture is subsequently analyzed to obtain the data list and the longitude and latitude information of the wi-fi hotspots. At this point, the detailed information of the surrounding wi-fi hotspots is known by the software.

Subsequently, the software will check the network state of the mobile terminal. If the mobile terminal is connected to the internet, the data list and the longitude and latitude information of the wi-fi hotspots may be directly sent to the server. If the mobile terminal is only connected to a wi-fi hotspot, then the wi-fi hotspot should be disconnected and the mobile data network should be accessed, and the mobile data network may be the normal 2G or 3G network.

After the server obtains the data list and the longitude and latitude information of the wi-fi hotspots, the server may query the password information accordingly. If the password is available, it proves that there is an available wi-fi hotspot, then the server sends the password to the mobile terminal so that the mobile terminal may try to connect to the available wi-fi hotspot. If there is no available wi-fi hotspot, the process ends and the connection to the internet is failed. When the mobile terminal fails to connect to the internet, the server repeats the step of querying and sending the password until the mobile terminal successfully connects to the internet.

The present invention also provides a wi-fi connection system for a mobile terminal, the system may be an application installed in the mobile terminal. The system includes:

a wireless transmission module for allowing a communication between the mobile terminal and the server; and a picture analyzing system for analyzing the picture of the interface of the wi-fi hotspots near the mobile terminal to obtain the data list and location information of the wi-fi hotspots:

wherein, the data list and location information are sent by the mobile terminal to the server via the wireless transmission module, the data list and location information are analyzed by the server to obtain the available wi-fi hotspot, and the password information of the available wi-fi hotspot is sent to the mobile terminal.

In the wi-fi connection method for a mobile terminal of the present invention, the data list and location information of wi-fi hotspots are obtained from the mobile terminal and sent to the server. The server analyzes the data list and location information of wi-fi hotspots to find out the available wi-fi hotspot and sends the password information back to the mobile terminal to make the mobile terminal connect to the wi-fi. Compared with the prior art, the efficiency and success rate of wi-fi connection are greatly improved.

Apparently, those skilled in the art can make many variations and modifications to the present invention without departing from the spirit and scope of the present invention. Thus, if the variations and modifications to the present invention fall within the scope of the appended claims and the equivalent technology of the present invention, the present invention is also intended to include the variations and modifications.

What is claimed is:

1. A wi-fi connection method for a mobile terminal, comprising: S1: obtaining wi-fi hotspots near the mobile terminal; S2: obtaining a data list and location information of the wi-fi hotspots; S3: sending the data list and the location information to a server; S4: analyzing, via the server, the data list and the location information to obtain an available wi-fi hotspot, and sending password information of the available wi-fi hotspot to the mobile terminal; and S5: connecting, at the mobile terminal, the available wi-fi hotspot based on the password information; and wherein a networking mode of the mobile terminal is checked before the step S3; if the mobile terminal has already been connected to a wi-fi network, then the operation ends: if the mobile terminal has already been connected to a mobile data network, S3 is subsequently performed: if the mobile terminal has already been connected to a wi-fi hotspot but fails to access an internet, then the wi-fi hotspot is disconnected and the mobile data network is connected.

2. The wi-fi connection method for a mobile terminal of claim 1, wherein step S2 further comprises, capturing, via the mobile terminal, a screenshot of an interface of the wi-fi hotspots near the mobile terminal to obtain a picture, analyzing the picture to obtain the data list of the wi-fi hotspots and analyzing the picture to obtain the location information of the wi-fi hotspots.

3. The wi-fi connection method for a mobile terminal of claim 1, wherein the data list comprises a wi-fi hotspot name, a signal intensity, and the number of the hotspots.

4. The wi-fi connection method for a mobile terminal of claim 1, wherein the location information is longitude and latitude information.

5. The wi-fi connection method for a mobile terminal of claim 1, wherein when the available wi-fi hotspot is obtained by the server, password information of the wi-fi hotspot which is most likely to be successfully connected is obtained by an analysis, and the password information of the wi-fi hotspot which is most likely to be successfully connected is sent to the mobile terminal.

6. The wi-fi connection method for a mobile terminal of claim 5, wherein the password information of the wi-fi hotspot which is most likely to be successfully connected is obtained by the analysis according to the location information.

7. The wi-fi connection method for a mobile terminal of claim 1, wherein if the mobile terminal fails to connect to the available wi-fi hotspot, the server sends password information of other wi-fi hotspot(s) to the mobile terminal.

8. The wi-fi connection method for a mobile terminal of claim 1, wherein the data list and the location information are sent to the server through a mobile data network.

9. A wi-fi connection system for a mobile terminal, comprising: a wireless transmission module for allowing a communication between the mobile terminal and a server; and a picture analyzing system for analyzing a picture of an interface of wi-fi hotspots near the mobile terminal to obtain a data list and location information of the wi-fi hotspots; wherein, the data list and the location information are sent by the mobile terminal to the server via the wireless transmission module, the data list and the location information are analyzed by the server to obtain an available wi-fi hotspot, and password information of the available wi-fi hotspot is sent to the mobile terminal.

* * * * *